United States Patent [19]
Nicholson et al.

[11] Patent Number: 5,914,698
[45] Date of Patent: Jun. 22, 1999

[54] MODULAR MESSAGE BOARD

[75] Inventors: Timothy Nicholson, Roseville; Gordon Melby; Paul Cobain, both of Woodbury, all of Minn.

[73] Assignee: ADDCO Manufacturing, Inc., St. Paul, Minn.

[21] Appl. No.: 08/634,031

[22] Filed: Apr. 15, 1996

[51] Int. Cl.[6] .................................................. G09G 5/00
[52] U.S. Cl. ............................ 345/1; 345/84; 340/908.1
[58] Field of Search ............................. 345/1, 2, 56, 82, 345/83, 84; 362/119; 313/500; 40/576; 340/908.1

[56] References Cited

U.S. PATENT DOCUMENTS

| | | | |
|---|---|---|---|
| 3,889,147 | 6/1975 | Groves | 313/500 |
| 4,050,834 | 9/1977 | Lee . | |
| 4,163,332 | 8/1979 | Salam . | |
| 4,197,527 | 4/1980 | Romney . | |
| 4,445,132 | 4/1984 | Ichikawa et al. . | |
| 4,471,350 | 9/1984 | Chow . | |
| 5,020,253 | 6/1991 | Lie et al. | 40/576 |
| 5,027,112 | 6/1991 | Ross et al. | 345/56 |
| 5,198,803 | 3/1993 | Shie et al. . | |
| 5,257,020 | 10/1993 | Morse | 340/908.1 |
| 5,390,093 | 2/1995 | Himeno et al. . | |
| 5,634,711 | 6/1997 | Kennedy et al. | 362/119 |

*Primary Examiner*—Chanh Nguyen
*Attorney, Agent, or Firm*—Palmatier, Sjoquist, Voigt & Christensen, P.A.

[57] ABSTRACT

The present invention is a modular electronic sign having a plurality of display units assembled on a mounting track and connected to a sign controller. Each display unit has a circuit board having a plurality of light emitting diodes arranged in a pattern thereon A microprocessor in each display unit is in communication with the sign controller and adjacent display units. Each display unit is environmentally sealed to avoid a separate enclosure for the modular sign. A plurality of standoffs are used to electrically connect the display units to power and communications conductors and mechanically connect the display units to the mounting track.

9 Claims, 9 Drawing Sheets

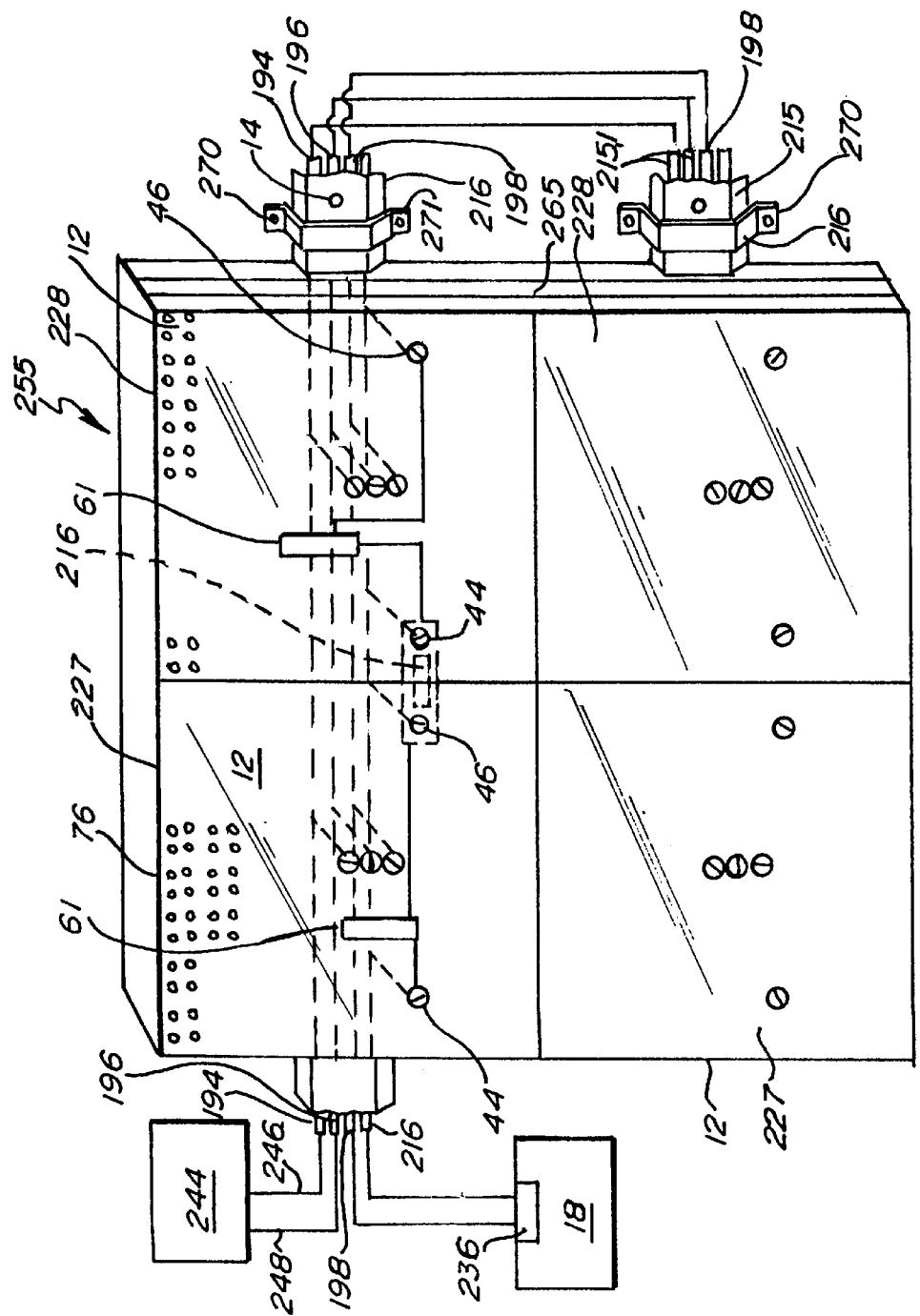

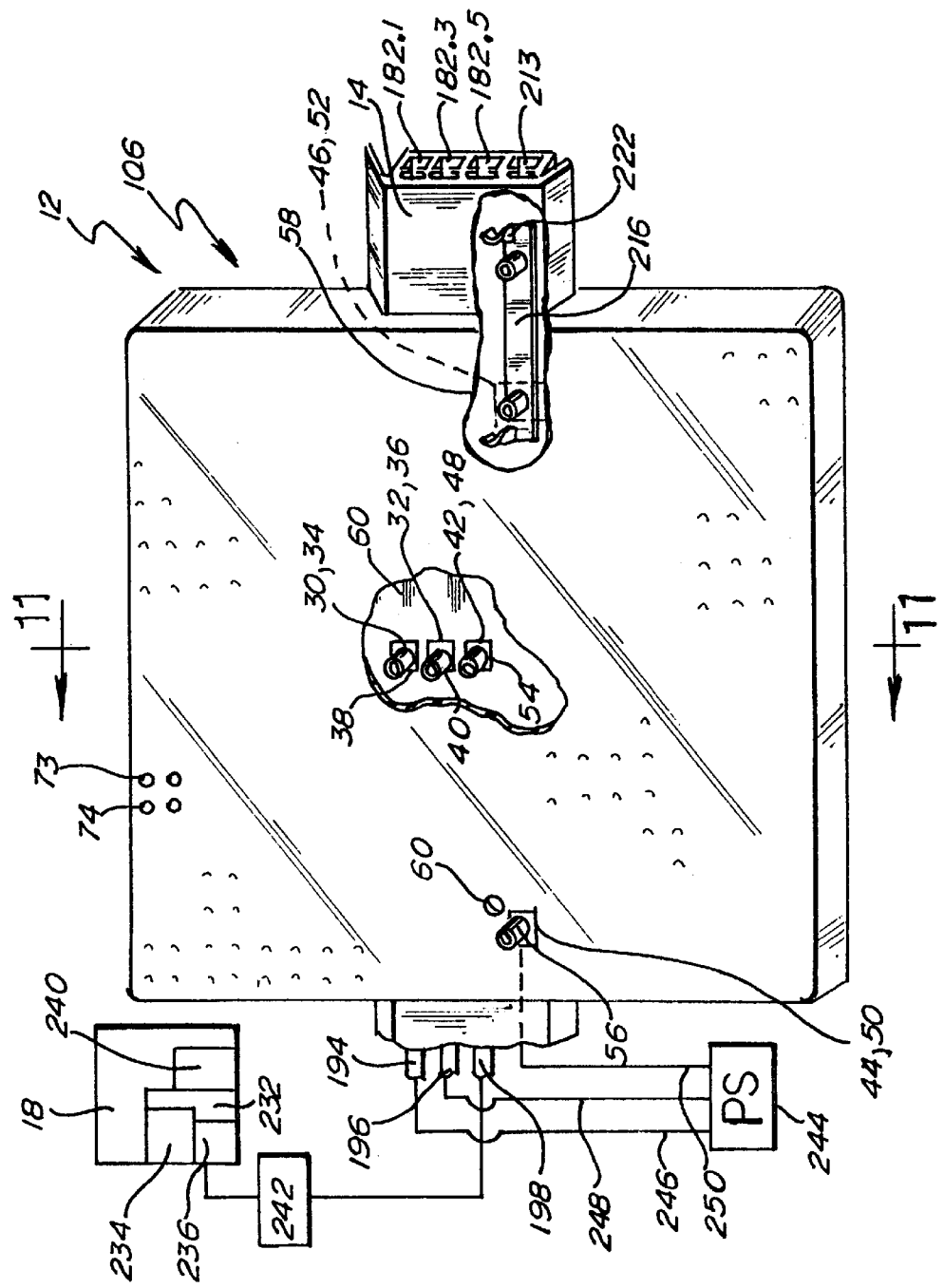

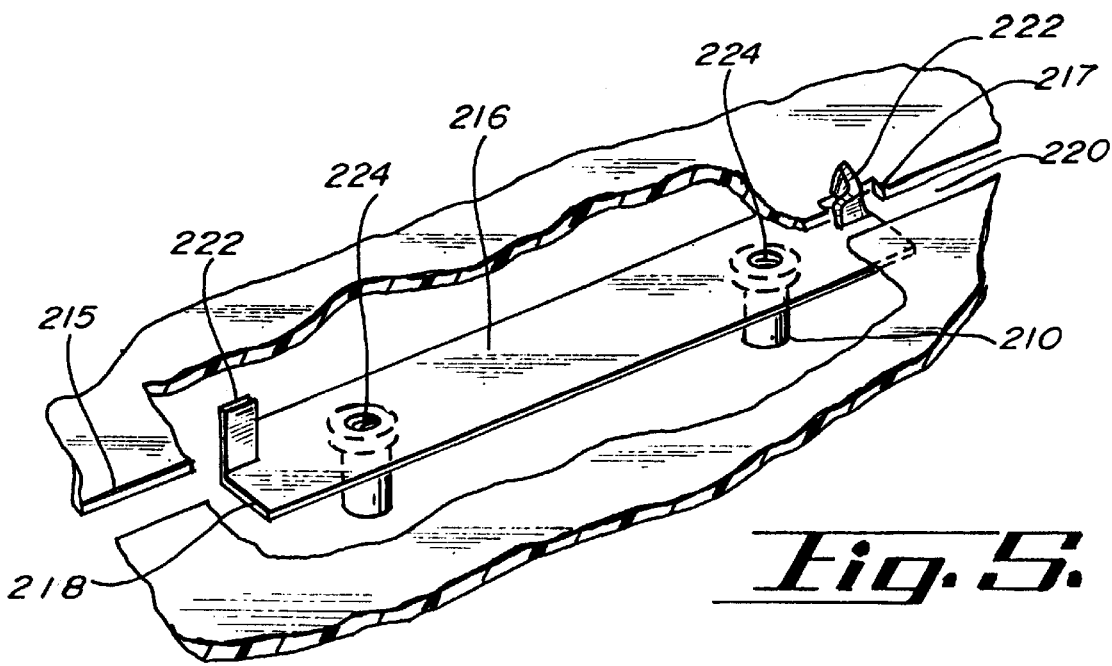
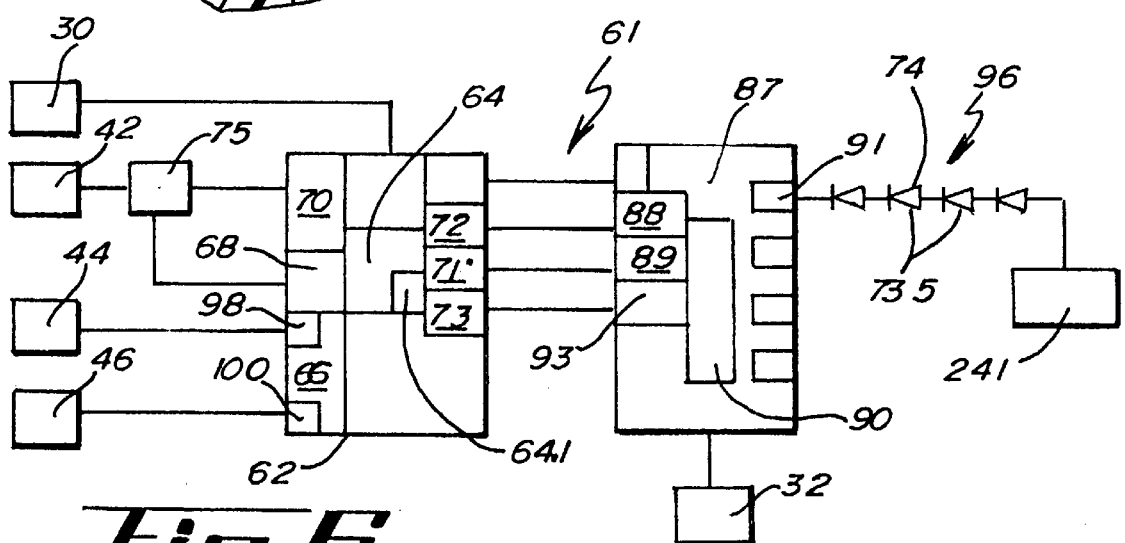
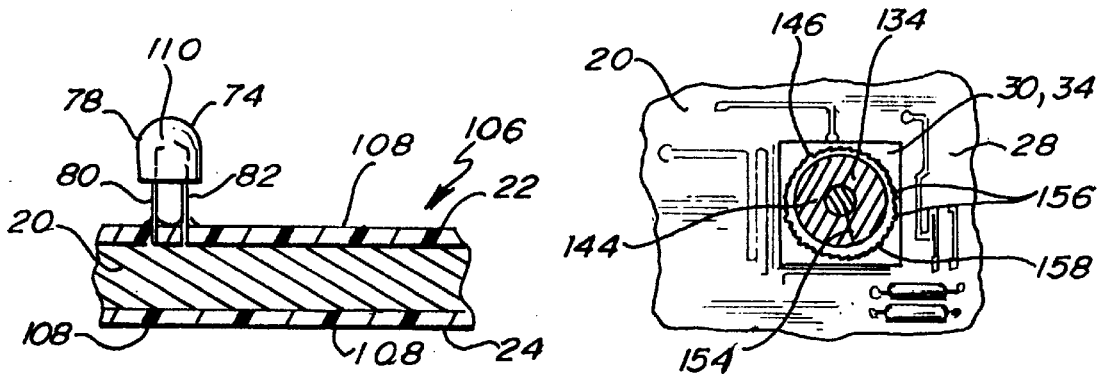

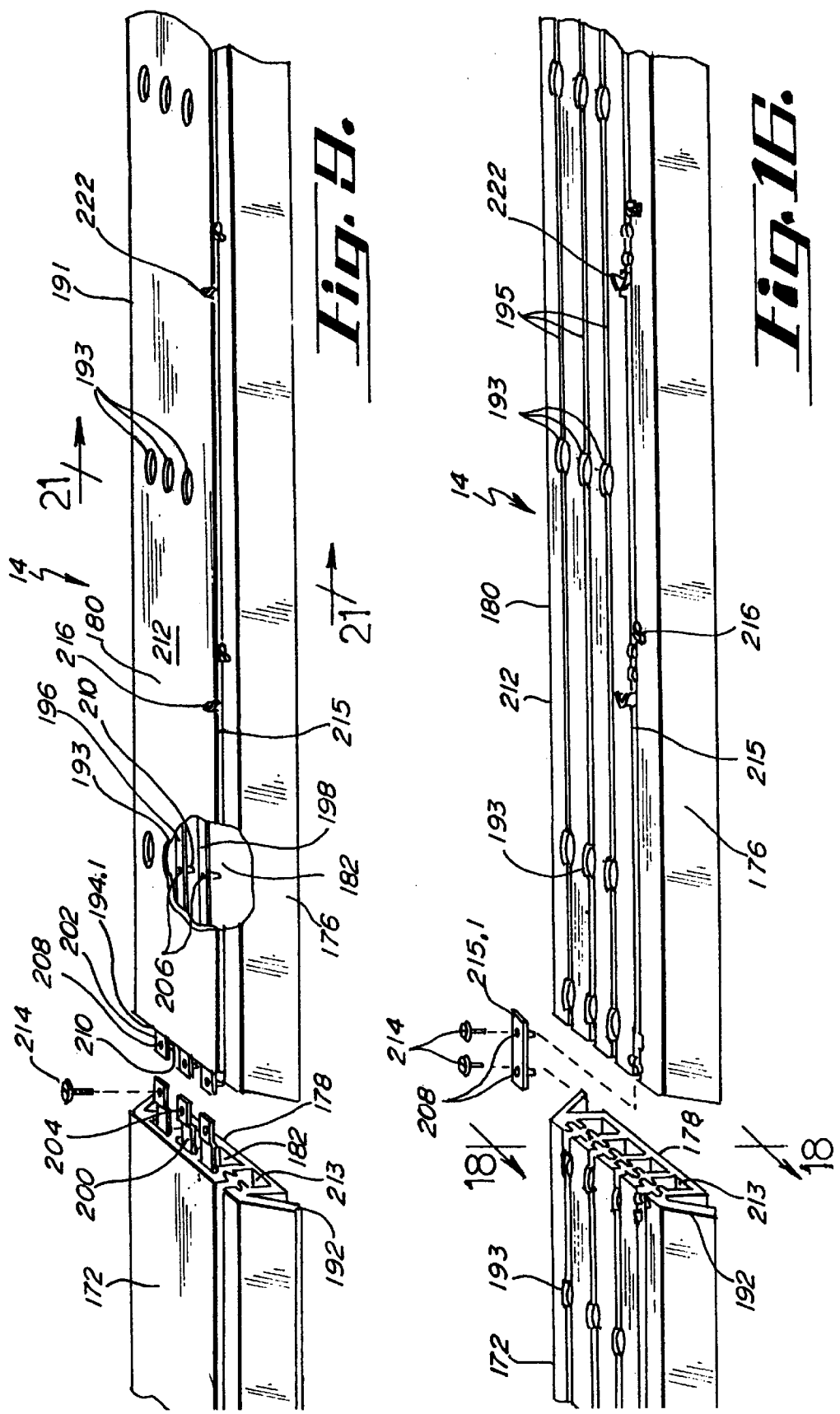

MODULAR MESSAGE BOARD

BACKGROUND OF THE INVENTION

The present invention relates to apparatus and methods for building a modular changeable information sign for use in outdoor and indoor environments.

Prior art changeable signs have been cumbersome and expensive due to the method of assembling the signs, the inability to reuse components and maintenance problems. Prior art changeable signs have also been difficult to modify and repair.

Furthermore, the prior art does not disclose a design using modular display units, making it easy to manufacture, while combining the benefits of a computer-based display unit. Prior art signs do not have components which are interchangeable. Prior art signs will not automatically readdress themselves for maintenance or reassembly. The prior art does not disclose a design which is reconfigurable into a new sign for a new purpose without extensive modification.

The prior art signs are not designed to be easily changed in height or width. The prior art does not disclose a design to easily change the dimensions of the sign to accommodate a greater width or a greater height or a different modular matrix pattern.

The present invention solves these problems with an assembly of computer based, recyclable, sealed display units, which may be assembled into a sign of varying proportions. Each display unit is further capable of being easily replaced with another display unit. The sign further has the capability and method of readdressing all display units in the sign for proper display of the information.

SUMMARY OF THE INVENTION

The present invention is a modular electronic sign having a plurality of display units assembled together and connected to a control computer. Each display unit has a circuit board having a display side with a plurality of light emitting diodes arranged in a pattern thereon. The light emitting diodes are controlled by a power switching transistor assembly which in turn is controlled by a microprocessor on the circuit board. The microprocessor is in communication with a sign controller and adjacent display units. The circuit board accommodates connecting the display unit to power and communication, via a pair of power connectors and several communication connectors. A light isolating spacer is positioned on the display side of the circuit board to help define the display elements. The light isolating spacer has a plurality of holes formed therein for allowing the LED's to extend into the spacer and project light through the spacer. A translucent cover has a silk screened pattern thereon and is mounted over the display side of the circuit board and the light isolating spacer. The display unit has a plurality of standoffs intermediate to the cover and the display side of the circuit board. The standoffs extend from the circuit board to the electrical connections. The standoffs form an environmentally sealed electrical connection to the circuit board. A mounting track may support the display units and provide power and communication connections. The mounting track has a first power conductor, second power conductor and a communication conductor. The first power conductor is connected to one power connector on each display unit mounted on the mounting track. The second power conductor is connected to another power connector on each display unit on the mounting track. The communication conductor in the mounting track is connected to a communication connector in each display unit. A sign controller controls the information displayed on the sign. The sign controller is a computer having a memory, an information input, and an information output. The computer is connected to the communication conductor to thereby communicate to each display unit mounted on the mounting track.

A feature of the present invention is a microprocessor in each display unit for controlling the light emitting diodes.

Another feature of the present invention is an interconnection between adjacent display units on a mounting track for addressing each display unit after it is mounted on the mounting track and is connected to the sign controller.

Another feature of the present invention is that the LED's may be arranged in a matrix pattern compatible with popular computer software such as Microsoft Windows® and associated applications.

Another feature of the present invention is a mechanical and electrical connection to allow a display unit to be removed from the mounting track and disconnected from adjacent display units without disturbing adjacent display units.

Another feature of the present invention is a mounting track which may be formed from a plurality of longitudinally joined segments to extend the length of the sign.

Another feature of the present invention is a mounting track which may be mounted in a parallel relationship with another mounting track to extend the height of the sign.

Another feature of the present invention is that the display units are individually sealed to protect the units from outdoor elements.

Another feature of the present invention is the circuit board in each display unit may be conformal coated.

Another feature of the present invention is a standoff which pierces a metal contact on the circuit board, creating a gas tight electrical connection to the underlying circuit board.

An advantage of the present invention is the display units may be reused to build a new sign.

Another advantage of the present invention is the display units may be individually removed and replaced on the sign and readdressed automatically.

Another advantage of the present invention is the display units may be removed from the middle of a mounting track without disturbing adjacent display units.

Another advantage of the present invention is the modular sign does not need to be separately housed in an enclosure because each display unit is sealed.

Another advantage of the present invention is the display units are electrically interchangeable.

Another advantage of the present invention is the display units may be mounted on to sides of a mounting structure to form a back-to-back modular sign.

Another advantage of the present invention is the mounting tracks may be mounted vertically on a mounting structure.

BRIEF DESCRIPTION OF THE DRAWINGS

FIG. 2 is a perspective view of four display units mounted in a matrix pattern.

FIG. 4 is a diagrammatic view of the connections to a mounting track.

FIG. 5 is a break away view showing a jumper in the mounting track.

FIG. 6 is a schematic block diagram of the circuitry in a display unit.

FIG. 7 is a cross section view showing a single light emitting diode mounted on the circuit board, and showing the conformal coating.

FIG. 8 is a view showing a standoff connected to a first mounting hole.

FIG. 9 is a perspective view of portions of two mounting track segments.

FIG. 16 is a perspective view of an alternate embodiment of the mounting track and an alternate connection between adjacent track segments.

DETAILED SPECIFICATION

Figure 1:
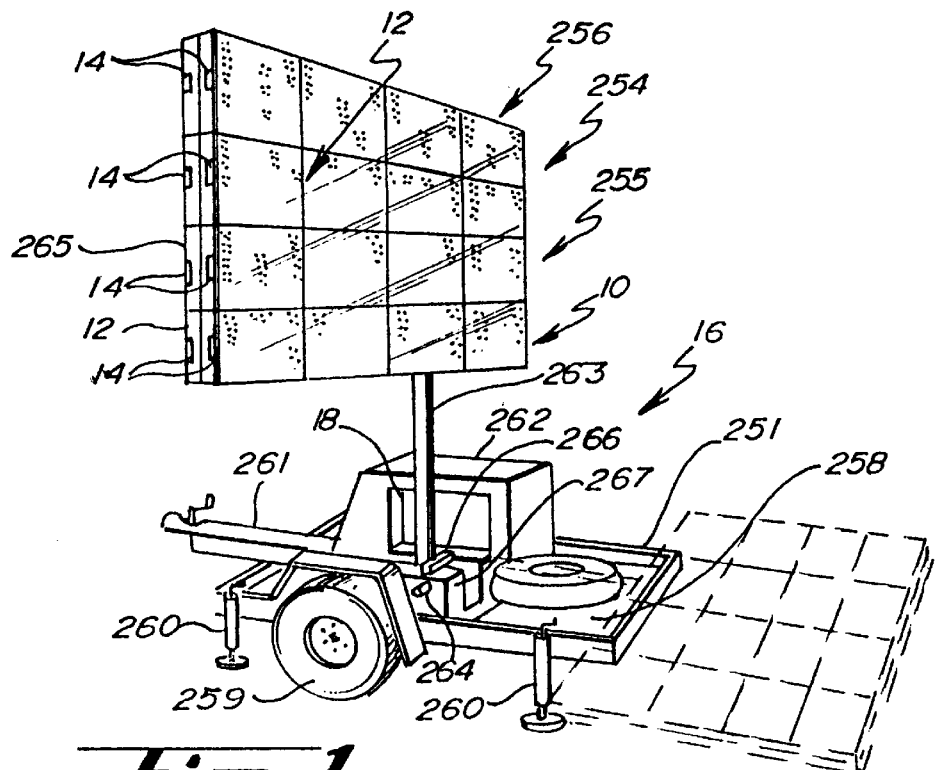
FIG. 1 is a perspective view of the modular sign mounted on a moveable mounting structure.

Referring to FIG. 1, a trailer mounted modular sign is shown. The modular electronic sign 10 generally comprises a plurality of connected display units 12, a plurality of mounting tracks 14 mounted on a mounting structure 16 and a sign controller 18. As illustrated in FIG. 1 the mounting tracks 14 may be mounted back-to-back to form a two sided sign 10.

A typical sign 10 may be made from a plurality of display units 12 on mounting tracks 14 mounted parallel to each other and attached to the mounting structure by clips 270. Each display unit 12 mounted on the mounting track 14 may display one or more characters and is vertically aligned with the display units 12 on adjacent mounting tracks 14 to form a pattern of display units 12 on the sign 10. It should be understood, the mounting tracks 14 may be mounted in a vertical or horizontal orientation. For purposes of illustration, the sign 10 will be discussed with reference to horizontally mounted mounting tracks 14.

The mounting structure 16 may comprise a trailer 251, having a platform 258 supported by wheels 259 rotatably mounted on the platform 258 as is well known in the art of trailers. Trailer 251 may have one or more jack stands 260 which are extendable to engage the ground to hold the platform 258 in a fixed position. A vehicle connector 261, such as a trailer hitch, may be used to move the mounting structure 16 to a proposed sign 10 installation location. An enclosure 262 on platform 258 may be used to provide environmental protection for sign controller 18.

Sign support 263 is attached to and supports sign plate 265 which may have a front side and a back side. The sign support 263 may be pivotally attached to the platform 258 at pin 264 and held in a vertical position by lock 266 and side supports 267. It should be understood that pin 264 extends into both side supports 267 and through the sign support 263.

Trailer 251 may also be used to transport sign 10 by removing lock 266 and pivoting sign support 263 about pin 264 until sign support 263 is in the horizontal position, as shown in dotted outline. Vehicle connector 261 is attached to a vehicle (not shown) such as a tractor, car or truck, the jack stands 260 are retracted to raise the jack feet to a non-engagement position with the ground or road surface. Lock 266 may be replaced across the side supports 267 to hold the sign support 263 in the horizontal position. It should be understood that sign 10 may alternatively be attached to a bridge, existing highway sign or building.

Referring to FIGS. 1, 2 and 4, the display units 12 are assembled to form a sign 10. The sign controller 18 is attached to a communication conductor 198 of each mounting track 14, and may have several information lines connected to separate mounting tracks 14. Alternatively, the mounting tracks 12 may have the communication conductor 198 wired together in series. The wires connecting the sign controller 18, including a power supply 244 may be run inside the sign support 263.

Power supply 244 is attached to first power conductor 194 and second power conductor 196 by wires 246 and 248. Power supply 244 may provide a direct current voltage source on first power conductor 194, and a ground connection to second power conductor 196.

Information to be displayed is input into sign controller 18 through information input 234. This information is stored in memory 232. A serial information output terminal 236 on sign controller 18 is used to connect to communication conductor 198 on the mounting track 14. Sign controller 18 may also be connected to a second communication connector 44 on display unit 12, via line 231.

Referring to FIG. 4, the sign controller 18 may be a general purpose computer, such as available from Hewlett Packard, comprising a memory 232, an information input 234 and a plurality of information outputs 236 such as serial communication ports, and a processor 240. One information output 236 is connected to the communication conductor 198 of each mounting track 14. Alternatively, the communication conductors 198 in sign 10 may be wired in series and connected to only one information output 236. Controller 18 communicates to each display unit 12 in a multi-drop scheme to address each display unit 12 and display information on sign 10 as will be clearly understood by a person familiar in the art of communication and display of information. The processor 240 in the controller 18 is connected to the memory 232, the information input 234 and the information output 236. A modem 242 may be mounted intermediate each information output 236 and the communication conductor 198 of the mounting track 14. The sign controller 18 has circuitry configured to address each display unit and create addressed bit maps of information to be displayed on the sign 10. Furthermore, the sign controller 18 has circuitry to reset all of the addresses of the individual, interchangeable display units 12 and readdress each display unit 12 individually.

As shown in FIGS. 2, 4 and 5, the respective conductors in adjacent first and second display units 227, 228 are electrically interconnected in series by jumpers, for example jumper 216, to facilitate assigning an address to each display unit 12. Each display unit has two connectors for attachment to the jumpers 216. A second communication connector 44 is located promimate the left side of a display unit and a third communication connector 46 is located promimate a right side of a display unit. The connectors 44, 46 in two adjacent display units can be interconnected by sliding a jumper 216 along the jumper channel 213 and aligning a fastener hole 224 (shown in FIG. 5) with a connector 44, 46, and threadably attaching the connector to the fastener hole 224 with a mounting screw 160. The adjacent display unit is similarly connected, by aligning a second fastener hole 224 in the jumper 216 with the connector and threadably securing a mounting screw 160 through the connector into the fastener hole 224.

Figure 10:
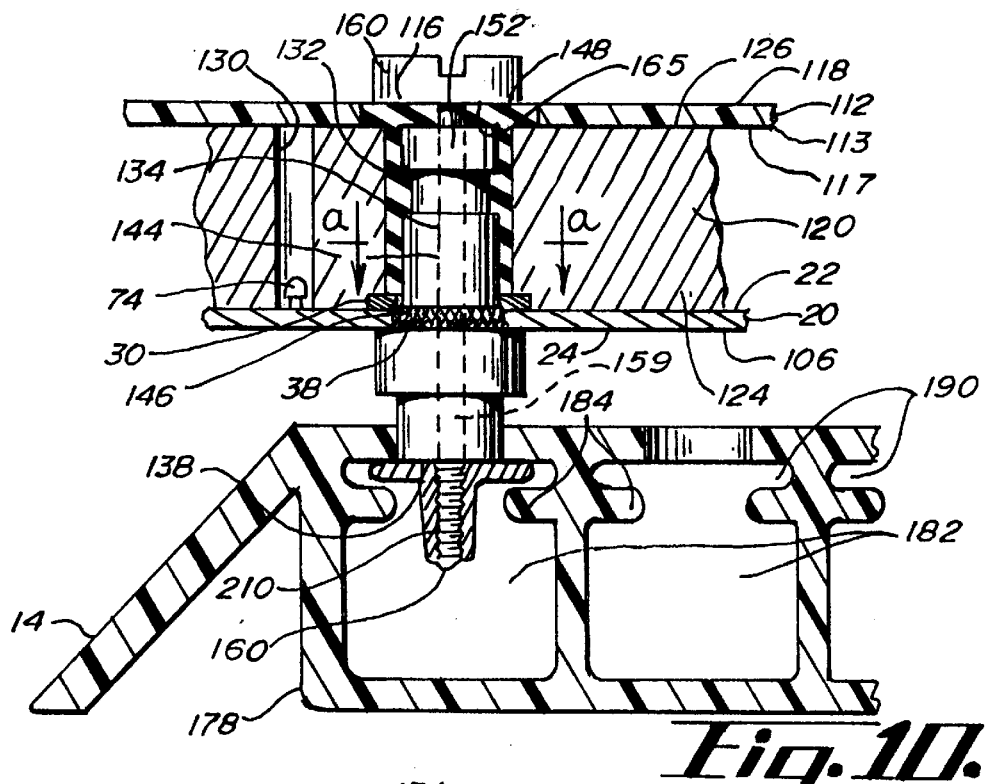
FIG. 10 is a detail section showing a mounting screw connecting the first power connection to the first power conductor.
Figure 11:
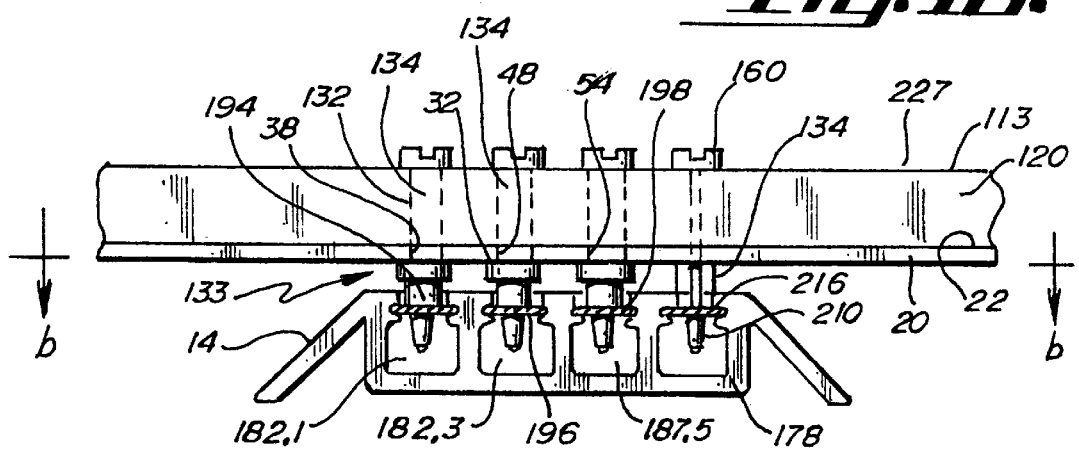
FIG. 11 is a detail section view taken at approximately 11—11 of FIG. 4.

FIGS. 10 and 11 illustrate a cross section view of the connectors in the display unit 12, engaged to the respective conductors in the mounting track 14, wherein electromechanical fasteners 133 comprising mounting screws 160 are used to make the various connections. A mounting screw 160 extends through the screw passageway 152 and threadably engages the self-clinching fastener 210 in the first end 218 of a jumper 216, illustrated in FIG. 5. As should be understood, the mounting screw 160 urges the knurl face 138 of the standoff 134, connected to the communication connector 44, to engage the jumper 216, forming a mechanical and electrical connection. The jumper 216, connected to first display unit 227, extends along the mounting track 14 to the adjacent display unit 228. The tabs 222 on the jumper 216 extend through the slot 215 in track 14 and are bent over to lie flush along the outside of the housing cover plate 191 or twisted to engage notch 217 and retain the jumper 216 in place as illustrated in FIG. 5.

As illustrated in FIG. 2, the connector 46 of the left-most first display unit 227 on mounting track 14 is connected to connector 44 of the adjacent second display unit 228 as described above for positionally locating each display unit 12. Each additional display unit 12 along the mounting track 14 is similarly attached to the adjacent display unit 12 on mounting track 14. The connector 44 of the left-most first display unit 227 is connected to either the sign controller 18 or the power supply 244.

Figure 3:
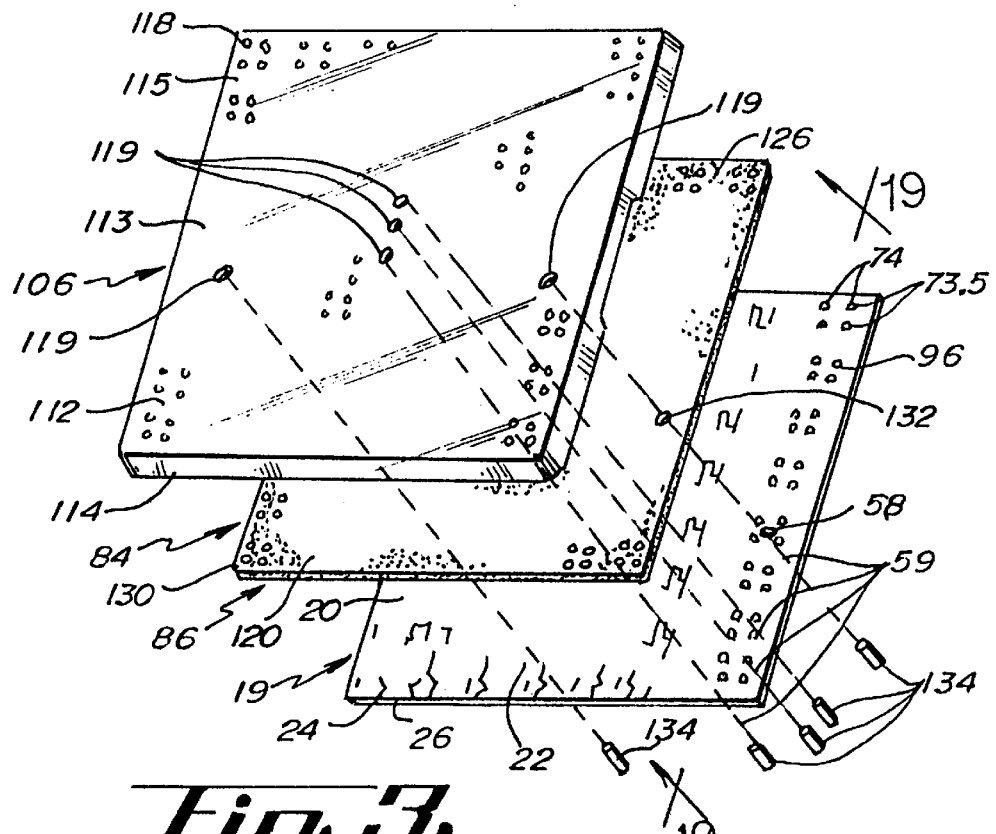
FIG. 3 is an exploded view of a display unit.

Referring to FIGS. 3 and 10, the display units 12 are electrically interchangeable and comprise a panel 19 such as a circuit board 20 having a display side 22, a back side 24 and an exterior edge portion 26 defining the shape of the circuit board 20. Electrical connecting traces may be conventionally formed on the circuit board 20 to electrically connect elements mounted on the circuit board 20.

Referring to FIG. 4, a first power connector 30 and a second power connector 32 are on the circuit board 20 and may extend from the back side 24 through to the display side 22 as illustrated in FIG. 10. The first and second power connectors 30, 32 respectively, are electrically isolated from each other and comprise first and second conductive pads 34, 36 respectively. The first and second conductive pads 34, 36 respectively comprise a metallic material such as tin, gold or silver and are solderably connected to the electrical conducting traces as is well known in the art of manufacturing circuit boards. The conductive pads 34, and 36 each have a mounting fastener hole extending through the circuit board 20 from the back side 24 to the front side 22.

A first communications connector 42 is mounted on the circuit board 20 in a manner similar to connectors 30 and 32. First communications connector 42 is used to connect to the communications conductor 198, and is mounted essentially the same as the other connectors. First communications connector 42 has an associated conductive pad 48 made from a metallic material such as gold or silver which is soldered to the electrical conducting traces on the circuit board 20.

Referring to FIGS. 10 and 11, a plurality of mounting screws 160 and standoffs 134 are used to mechanically mount the display units 12 and electrically connect the display units 12 for power and communication. The standoffs 134 extend between the circuit board 20 and the translucent cover 112.

Figure 12:
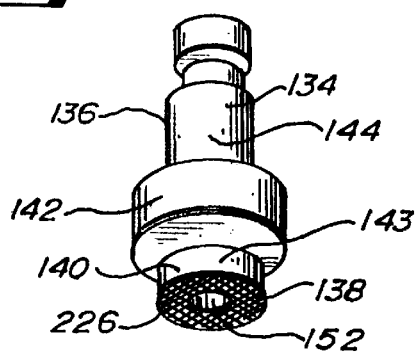
FIG. 12 is a perspective view of a standoff.
Figure 13:
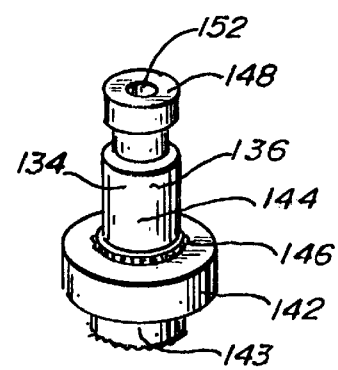
FIG. 13 is a perspective view of a standoff.

As illustrated in FIG. 12 and 13, each standoff 134 comprises a body 136 having a knurl face 138 on a first end, a shoulder 142 spaced from the knurl face 138 on the body, a neck 143 intermediate to the knurl face 138 and the shoulder 142 and a shank 144 extending from the shoulder 142 to the second end of the body. A straight knurl portion 146, is formed on the shank 144 adjacent the shoulder 142. A cover face 148 is on the second end of the body. A screw bore 152 extends through the body of the standoff 134 from the second end to the first end.

As illustrated in FIGS. 10 and 11, each standoff 134 is attached by inserting the second end of the body into a mounting fastener hole in the circuit board 20 from the back side 24. The assembly of the standoff 134 and circuit board 20 will be further described with respect to one of the mounting fastener holes. The shank 144 of the standoff 134 has a radius 154 from the shank axis sized to securely fit in the mounting fastener hole as illustrated in FIG. 8. The straight knurl portion 146 of the shank 144 has a plurality of splines 156 extending radially from the shank 144. The splines 156 extend beyond the radius a length sufficient to engage the circuit board 20. Each spline 156 makes a physical and electrical connection between standoff 134 and a conductive pad 34. It should be understood, the electrical connection between standoff 134 and a conductive pad is gas tight and preserves the integrity of the connection by not allowing moisture in between the standoff 134 and the pad.

Referring to FIG. 10, the circuit board 20 is supported on the shoulder 142 of the standoff 134 which bears against the back side 24 of the circuit board 20. The cover face 148 of the standoff 134 is flush with the translucent cover 112 having the screw bore 152, axially aligned in a screw hole in the translucent cover 112. In this arrangement, the screw bore 152 in the standoff 134 which extends through the mounting hole and opens through the knurl face 138 defines a screw passageway through display unit 12 from outside the translucent cover 112 and through the circuit board 20. The neck 143 spaces the knurl face 138 from the back side 24 of the circuit board 20. It should be understood that the cover face of the standoff 134 may be sealingly attached to the translucent cover 112. The sealing attachment may be with a sealant 116 applied intermediate to the standoff 134, the spacer 120 and the translucent cover 112 or may be an o-ring on the cover face or similar means known in the art of sealingly attaching two elements.

A separate mounting screw 160 is inserted into the display unit 12 through each screw bore 152. In assembly, the end of the mounting screw 160 is inserted through the screw bore 152 of the standoff 134. The threaded portion of the mounting screw extends from the knurl face 138, of the standoff 134. The driving head 165 bears against the cover face 148 of the standoff 134.

Referring to FIGS. 9–11 and 21, the display units 12 may be connected to each other and the mounting structure 16 by a mounting track 14 comprising a plurality of track segments 172. The mounting track 14 may comprise a housing 176 having a housing base portion 178 and a housing cover portion 180. The housing base portion 178 is extruded to form a plurality of longitudinal conductor channels 182 extending the length of the base 178 illustrated as conductor channels 182.1, 182.3, 182.5, and 182.7 respectively. A fastener chamber 190 is defined in each longitudinal conductive channel 182 intermediate to the bottom of the base 178 and side ribs 184.

Referring to FIGS. 9 and 16, the housing cover portion 180 has a plurality of fastener holes 193 formed therein. The fastener holes 193 in the housing cover portion 180 extend through the housing cover plate 180 and open into a longitudinal conductor channel 182. The fastener holes 193 in the housing cover portion 180 are formed in a predetermined pattern along each longitudinal conductor channel 182 and are sized to allow the neck 143 of standoff 134 to extend through housing cover plate 181 as illustrated in FIG. 10.

In an alternative embodiment illustrated in FIG. 16, slots 195 may be formed in housing cover plate 180 in communication with each longitudinal conductor channel 182. In this embodiment, fastener holes 193 are formed in slots 195.

Figure 21:
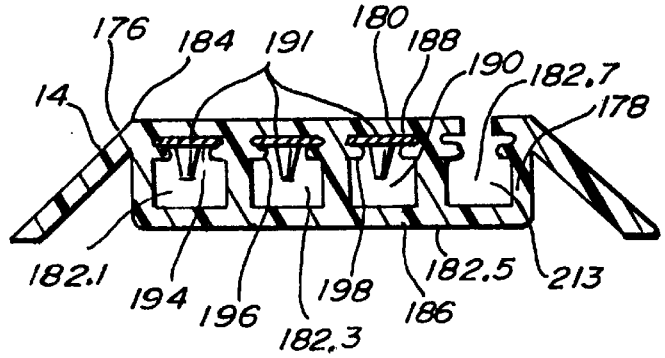
FIG. 21 is a section view of the mounting track taken at approximately 21-21 of FIG. 9.

Referring to FIG. 21, mounting track 14 further comprises a plurality of electrical conductors in the housing 176. The electrical conductors comprise a first power conductor 194, mounted in the channel of first longitudinal conductor channel 182.1 and a second power conductor 196 mounted in the second longitudinal conductor channel 182.3, and a third communication conductor 198 mounted in third longitudinal channel 182.5. The conductors respectively extend the length of the housing 176.

Figure 22:
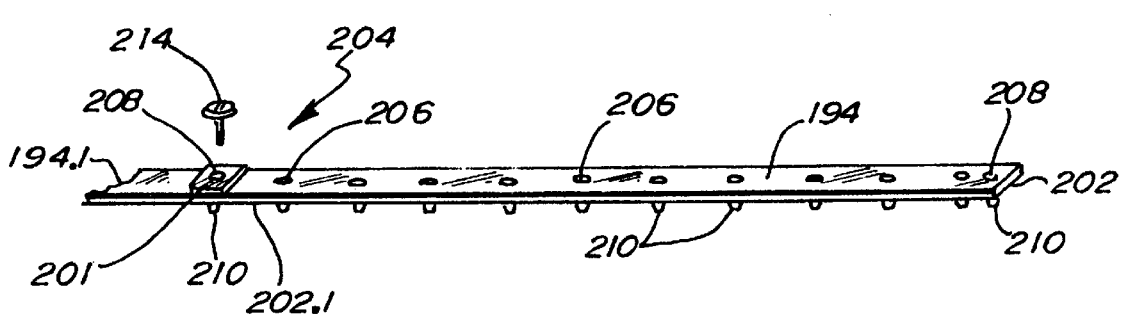
FIG. 22 is a perspective view of first power conductor removed from the mounting track.

Referring to FIG. 22, the first power conductor 194 will be described for purposes of illustration. The second conductor 196 and the communication conductor 198 are structurally identical to the first power conductor 194 but may have different spacings between mounting holes 206. The first conductor 194 has a first end 201 and a second end 202. The first end 201 may have an offset portion 204 to allow for overlap and connection to the second end 202 of an adjacent first power conductor 194.1.

Figure 18:
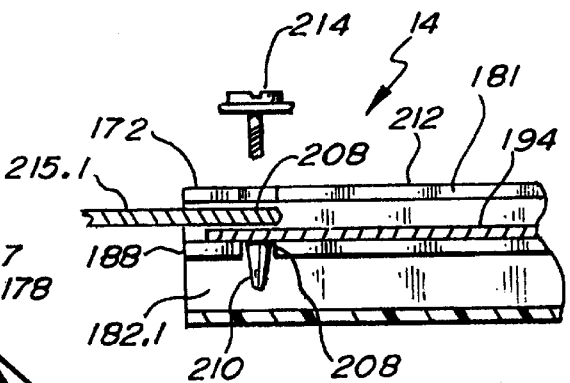
FIG. 18 is a section view taken at approximately 18—18 of FIG. 16.

Alternatively as illustrated in FIGS. 16 and 18, first power conductor 194 may not have offset portion 204. Continuing to refer to FIG. 22, a plurality of mounting holes 206 are formed along the length of the first power conductor 194. The mounting holes 206 in the first power conductor 194 are each spaced a predetermined distance from the first end 201. The predetermined distance of the spacing of the mounting holes 206 of the first power conductor 194 match the predetermined pattern of the fastener holes 193 in housing cover portion 180 illustrated in FIGS. 9 and 16. Each mounting hole 206 in the first power conductor 194 is coaxially aligned with fastener hole 193 extending through the housing cover portion 180 into the first longitudinal conductor channel 182.1. It should be understood, the fastener hole 193 serves to facilitate proper position of the display unit 12 along mounting track 14 by receiving the neck 143 of the standoff 134. The fastener hole 193 also allows the knurl face 152 of the standoff 134 to bear against the first power bar 194 forming an electrical and mechanical connection as illustrated in FIG. 10.

A conductor joining hole 208 may be formed in the first end 201 and the second end 202 of the first power conductor 194. A self-clinching fastener 210 is mounted in each mounting hole 206 and may be in the connecting joining holes 208 in the first and second ends 201 and 202 respectively of the first power conductor 194. The self-clinching fasteners 210 in the first power conductor 194 extend into the fastener chamber 190 of the first longitudinal conductor channel 182.1 as illustrated in FIG. 10.

Referring to FIGS. 9, 16 and 22, the track 14 may be formed of a plurality of track segments 172 mechanically and electrically joined together. First power conductor 194 may join to an adjacent first power conductor 194.1 of a second track segment 212 by slidably aligning the offset portion 204 of the first power conductor 194 to coaxially align the conductor joining hole 208 in the offset portion 204 of the first power conductor 194 with the conductor joining hole 208 in the second end 202.1 of the first power conductor 194.1 of the adjacent second housing 212 having a self-clinching fastener 210 mounted therein. A conductor joining screw 214 is threadably inserted through the conductor joining hole 208 of the offset portion 204 of the first power conductor 194 and into the self-clinching fastener 210 in the conductor fastener hole 208 in the first power conductor 194.1 in the second track segment 212 to provide a mechanical and electrical connection.

Referring to FIGS. 16 and 18 first and second ends 201, 202 respectively may be recessed inside mounting track segment 212. In this embodiment link 215.1 having a conductor joining hole 208 in each end is inserted into the channel to coaxially align one conductor joining hole 208 in link 215.1 with the conductor joining hole 208 in first power conductor 194 having a self-clinching fastener 210 mounted therein. Conductor joining screw 214 is mounted through the conductor joining hole 208 in link 215.1 and threadably connected to the self-clinching fastener 210 in the conductor joining hole 208 in first power conductor 194. The link 215.1 is similarly connected to the adjacent first power conductor 194 in the second mounting track segment 172.

Referring to FIG. 9, 16 and 21, a longitudinal jumper chamber 213 may also be formed longitudinally in the housing 176 generally parallel to the longitudinal conductor channels 182. A slot 215 is formed longitudinally in the housing cover portion 180 extending through the cover plate 181 and into the longitudinal jumper chamber 213 along the length of the track segment 172. A plurality of jumpers 216 are slidably inserted into the longitudinal jumper chamber 213.

The display units 12 may be mounted on the mounting track 14 using the mounting screws 160. As illustrated in FIG. 10, the display unit 12 is positioned on the mounting track 14 to axially align the neck 143 of each standoff 134 in a fastener hole 193 in the mounting track 14. The mounting screw 160 extends from the cover face 148 of the translucent cover 112 and threadably engages the self-clinching fastener 210 in a fastener hole 193 in the first power conductor 194 to compress the standoff 134 forming mechanical and electrical connection.

Referring to FIGS. 10 and 11, the neck 143 of the standoff 134 extends through the housing cover plate 181 and spaces the knurl face 138 a distance from the back side 26 of the circuit board 20. Knurl face 138 of the standoff 134 bears against the first power conductor 194 adjacent to the fastener hole 193, containing the self-clinching fastener 210 threadably engaged by the mounting screw 160. The knurl face 138 has splines 226 extending therefrom, illustrated in FIG. 12, to penetrate the first power conductor 194 to form a mechanical, and electrical connection. The connection is formed between the power connector of the display unit 12, and the power conductor when the mounting screw 160 is tightened to bear against the cover face 148 of the standoff 134 and compress the standoff 134 between the driving head of the mounting screw 160 and the power conductor. It should be understood, the self-clinching fastener is attached to the bottom of each conductor in the mounting track 14. This allows the top portion of each conductor to interface with the knurl face 138 of the standoff 134 providing a mechanical and electrical connection.

Referring to FIG. 6, the circuitry 61 in the display unit 12 is configured distribute the processing of the sign and to make each display unit 12 individually addressable, interchangeable with other display units and to display information received from the sign controller 18. The circuitry 61 comprises a microprocessor 62 having a memory 64 for storing an address of the display unit and for storing bit map information of several images to be displayed on the display unit 12, an addressing portion 66, a signal receiver portion 68, and a signal generator portion 70, a strobe portion 71, message output portion 72, and an output enabler portion 73. The memory 64 of the microprocessor 62 is in communication with the addressing portion 66, the signal receiver portion 68 and the signal generator portion 70. The signal receiver portion 68 and the signal generator portion 70 are in communication with a signal buffer 75 connected to the first communication connector 42. The addressing portion 66 of the circuitry 61 is connected to the reset connector 44 and the reset 46. A light driver 87 is connected to the microprocessor 62 and may be a 32 bit shift register having a plurality of outputs 91, controlled by flip-flops 90. The microprocessor 62 may be an 8021 type having a flash memory as part of the circuitry. Signal buffer 75 may be a Schmitt trigger to buffer data received from the sign controller 18 and facilitate communication from the microprocessor 62 to the sign controller.

Each light driver 87 has a message input 88, a strobe input 89, a power connector connected to the second power connector 32 on the circuit board 20, a flip-flop memory 90 and a plurality of drive transistors. A power input 93 on the light driver 87 is connected to the drive transistor on the light driver 87 and to the output enabler portion 73 on the microprocessor 62. The message input 88 of each light driver 87 is connected to the memory 90 in the light driver 87 and to the message output portion 72 on the microprocessor 62. The drive transistors are connected to the light emitting diodes 74 by an electrically conductive circuit board trace. Each drive transistor controls a display element 96 comprising one or more light emitting diodes 74 in the matrix 76. The display element 96 may comprise four (4) light emitting diodes 74.

Referring to FIG. 6, an addressing input 98 on the microprocessor 62 is in communication with the addressing portion 66. The addressing input 98 may be connected in the circuitry 61 and is in communication with the connector 44. The microprocessor 62 further comprises addressing output 100 connected to connector 46.

Figure 19:
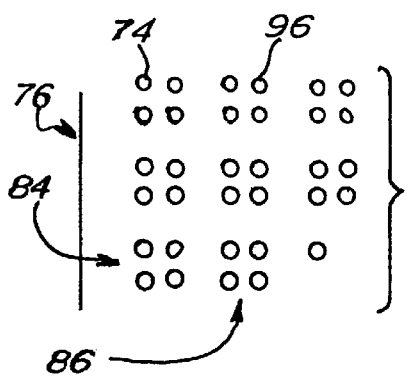
FIG. 19 is a section view taken at approximately 19—19 of FIG. 3 illustrating the first matrix pattern.

Referring to FIG. 7, a plurality of visually distinguishable indicators such as light emitting diodes 74 are mounted on the display side 22 of the circuit board 20 in a pattern. Each light emitting diode 74 comprises a body 78, a first and a second flexible electrical connection 80, 82 respectively. The body 78 of the light emitting diode 74 is spaced from the display side 22 of the circuit board 20. The first and second flexible electrical connectors 80, 82 respectively, allow alignment of the body 78. The light emitting diodes 74 may be arranged in a first matrix pattern 76 as illustrated in FIG. 19. The first matrix pattern 76 having a number of rows 84 and columns 86. The light emitting diodes 74 may also be equally spaced from adjacent light emitting diodes 74 along each row 84 and column 86. The light emitting diodes 74 may be single color emitting white or yellow light or may be a color LED having a red, blue and yellow light source therein.

Referring to FIG. 7, the display unit further comprises a sealing envelope 106 to isolate the circuit board 20 and the circuitry 61 from environmental elements such as moisture. The sealing envelope 106 may comprise a conformal coating 108 applied to the circuit board 20. As is well known in the art of sealing circuit boards 20, after the elements have been fastened to the circuit board 20, the circuit board 20 is dipped or sprayed with a polymer 108 to coat and isolate the circuit board 20 and the attached elements from the environment. It should be noted, as shown in FIG. 7, the spacing of the body 78 of the light emitting diode 74 from the display side 22 of the circuit board 20, allows adjustable alignment of the body 78 for pointing the light source 110 inside the light emitting diode 74 at a predetermined target by bending the flexible electrical connectors 80, 82 on light emitting diode 74. This spacing of the body 78 of the light emitting diode 74 also allows the conformal coating 108 to coat the flexible electrical connectors 80, 82 respectively.

As illustrated in FIG. 3, the sealing envelope 106 may also comprise a translucent cover 112 sealingly attached to the display side 22 of the circuit board 20. The translucent cover 112 has a lens portion 113 and an edge channel 114 shaped to fit over the exterior edge portion 26 of the circuit board 20. The lens portion 113 extends over the display side 22 of the circuit board 20. A sealant such as silicone, potting fluid or a similar material may be applied to the exterior edge portion 26 of the circuit board 20 and the interior side of edge channel 114 on the translucent cover 112 to sealingly attach the translucent cover 112 to the circuit board 20. The lens portion 113 of the translucent cover 112 has an inside surface 117 and an outside surface 118 as illustrated in FIG. 10. The translucent cover 112 may have a design 115 silk screened on the lens portion 113 to further enhance the light produced by the light emitting diodes 74 on the display side 22 of the circuit board 20. The design may be a masking of the space between adjacent light emitting diodes 74 to enhance the visual clarity of each display element 96. Translucent cover 112 has screw holes 119 in the lens portion 113. The screw holes 119 are axially aligned with the first, second, third, fourth and fifth mounting fastener holes 38, 40, 54, 56, 58 respectively in circuit board 20 when translucent cover 112 is on circuit board 20.

Figure 20:
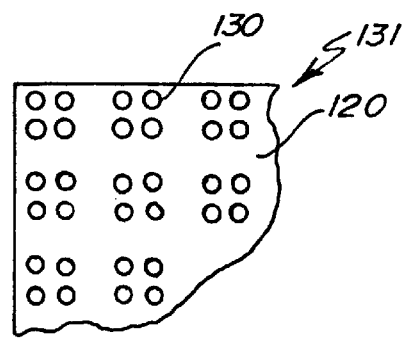
FIG. 20 is a section view of the spacer taken at approximately 20—20 at FIG. 3 illustrating the second matrix pattern.

Referring to FIGS. 3 and 10, the sealing envelope 106 may also comprise a spacer 120. The spacer 120 may be placed between the translucent cover 112 and the display side 22 of the circuit board 20. As illustrated in FIG. 10, the spacer 120 may be of a light blocking, structural, foam having a side on the circuit board 20 and a cover side 126 adjacent to the inside surface 118 of the translucent cover 112. A plurality of LED holes 130 are formed in the spacer 120 to allow each light emitting diode 74 to extend into the spacer 120 and transmit light through spacer 120 and the translucent cover 112. It should be understood, the LED holes 130 in the spacer 120 are arranged in a second matrix pattern illustrated in FIG. 20. The second matrix pattern 131 may be identical to first matrix pattern 76 pattern of the light emitting diodes 74 on the circuit board 20. Mounting fastener holes 132 in the spacer 120 are axially aligned with each of the mounting fastener holes in the circuit board 20 and the coaxial, corresponding screw holes 119 in the lens portion 113 of the translucent cover 112.

Figure 15:
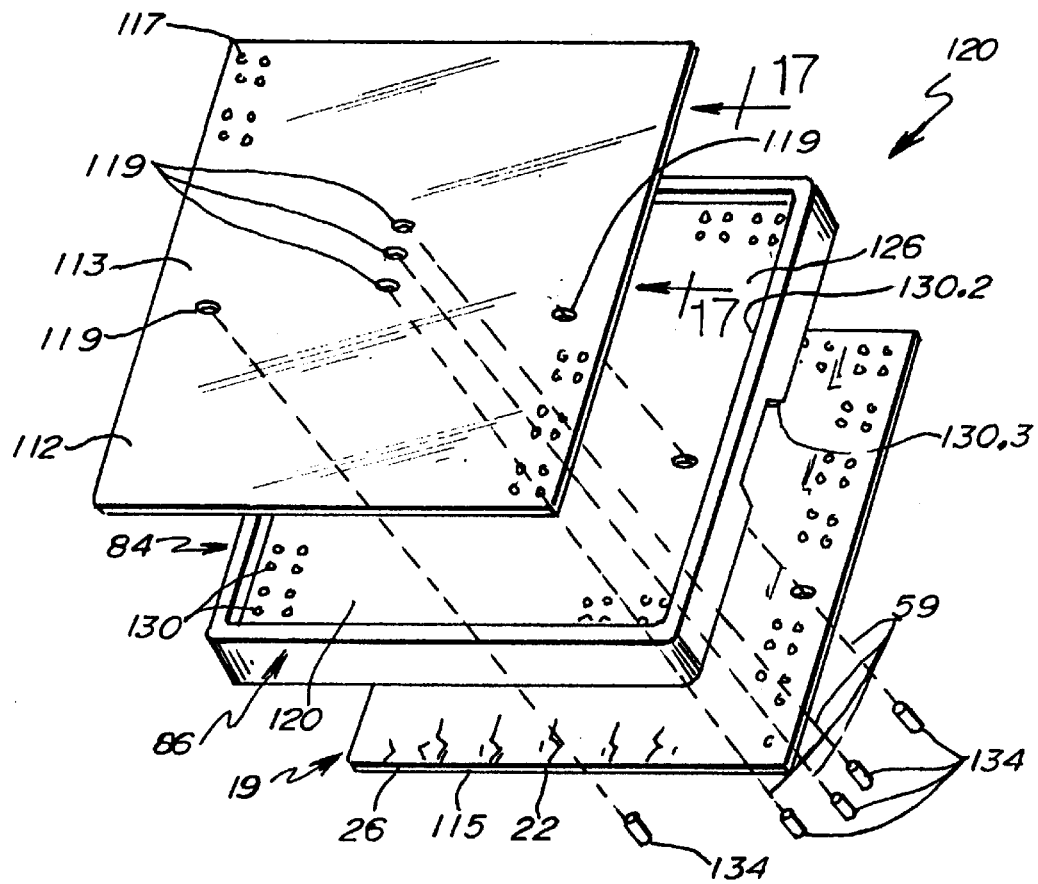
FIG. 15 is an exploded view of a display unit, illustrating an embodiment of the cover and spacer.
Figure 17:
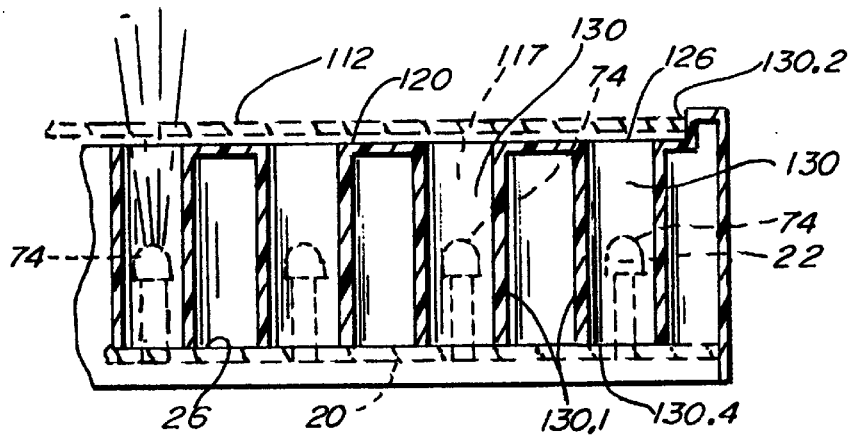
FIG. 17 is a section view taken at approximately 17—17 of FIG. 15.

As illustrated in FIG. 15, the translucent cover 112 may comprises lens portion 113 on the spacer 120. In this embodiment, spacer 120 may be molded of a colored, light absorbing plastic having an edge portion 130.3 to fit over mounting track 14. The LED holes 130 are molded openings in the spacer 120. As illustrated in FIGS. 15 and 17, the LED holes 130 comprise a tubular form extending from the cover side 126 of spacer 120 to the display side 22 on the circuit board 20. Each tubular form has an end opening to receive a light emitting diode 74 positioned adjacent circuit board 20 as shown in outline in FIG. 17. The translucent cover 112 is sealingly attached to the cover side 126 of the spacer 120 in insert depression 130.2 to seal the LED holes from the environment.

Figure 14:
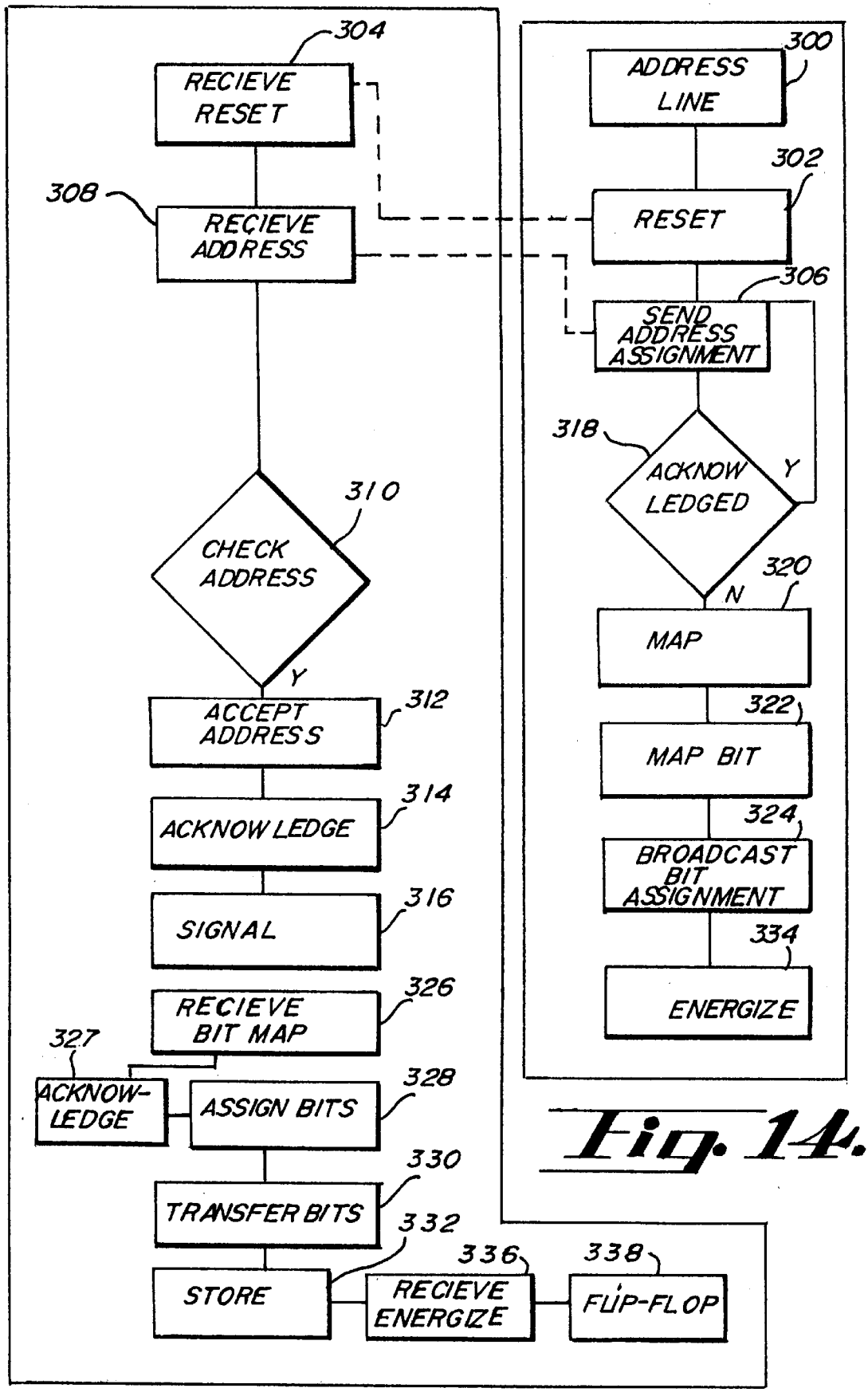
FIG. 14 is a block diagram of the process for operating the modular sign.

As described in FIG. 14, the signal controller 18 performs a sequence of operations illustrated as a block diagram of the process to sequentially address each display unit 12 along a particular mounting track 14 and display information on sign 10. Address line block 300 assigns each mounting track 14 an address based on the information output 236 to which it is connected. Reset block 302 broadcasts a reset command to all display units 12 on each mounting track 14. This reset command is received by the microprocessor 62 in each display unit 12 and is communicated to addressing device 66 to nullify any current address assignments.

As illustrated in FIGS. 2, 6 and 14, display units 12 may be connected to signal controller 18 by reset line 231 in signal controller 18 connected to connector 44. In this embodiment, the command from reset address block 302 resets the address of each display unit by signalling the signal controller 18 to send a reset signal on reset line 231 to connector 44. Addressing device 66 in microprocessor 62 in display unit 12 receives the reset command. Microprocessor 62 in display unit 12 goes into a reset mode when the receive reset block 304 detects the signal and resets address block 302. The reset mode drives address output 100 on microprocessor 62 to a signal high condition. The signal from the address output 100 is communicated to the addressing input 98 in the second display unit 228 by jumper 216. The signal from addressing output 100 on first display unit 227 causes the microprocessor 62 of the second display unit 228 to go into a reset mode. This operation sequentially resets all display units 12 in each line 254 in sign 10.

After all display units 12 have had their respective addresses reset, reset address block 302 commands reset line 231 to drop signal the microprocessor 62 in the first display unit 227 to change from reset mode to run mode. Send address assignment block 306 broadcasts a display unit address on communication conductor 198. Display units 12 receives the broadcast address from sign controller 18 at receive address block 308. Upon receiving a new address, microprocessor 62 in first display unit 227 commands the check address block 310 to determine if the first display unit 227 has an address. If the first display unit 227 has an address, the address received is disregarded by the microprocessor 62 in first display unit 227. If the check address block 310 determines the first display unit 227 does not have an address, the address is accepted by accept address block 312 and acknowledged by acknowledge block 314. As described above, the adjacent, second display unit 228 is still in the reset mode as first display unit 227 has a signal high condition on address output 100 and across the jumper 215 connecting the second display units 228. Signal block 316 commands the address output 100 to signal second display unit 228 to change from the reset mode to the run mode to receive the next address assignment.

As illustrated in FIG. 14, if an address assignment is acknowledged by acknowledge block 314 in a display unit 12, acknowledged block 318 initiates the sending of another address along communication conductor 198. This process is repeated until all display units 12 on mounting track 14 are addressed by signal controller 18.

Alternatively, as illustrated in FIG. 4 and 14, power supply 244 may be connected to the second communication connector 44 on the first display unit 227. In this embodiment, reset address block 302 broadcasts an address reset command along communication conductor 198. All display units 12 connected to communication conductor 198 reset their address. The five volt signal from power supply 244 is received by first display unit 227 at addressing device 66 illustrated in FIG. 6. Addressing output 100 is commanded to be set out zero volts.

Send address block 306 broadcasts an address signal having an address on communication conductor 198. Receive address block 308 in display unit 12 receives the address from computer 230. Check address block 310 checks for the five volt signal at addressing input 98 illustrated in FIG. 6. If there is a signal at addressing input 98, check address block 310 determines if the first display unit 227 has an address. If no address is assigned to the first display unit 227 and the address input 98 is receiving the five volt signal, accept address block 312 accepts the address from computer 230 and assigns it to the first display unit 227. Acknowledge address block 314 acknowledges the receipt and assignment of the address to computer 230 by signalling along communication conductor 198. Signal block 316, in this embodiment, gives a high signal command to address output 100 to address input 98 of the second display unit 228.

The acknowledge block 314 sends an address assignment acknowledgement through signal generator 70 back to computer 240 to acknowledge the receipt of the address which was broadcast. Address assignment block 306 in the computer 230, broadcasts another address assignment command for the next address along communication conductor 198. Again, the second display unit 228, having no address assignment, receives the address broadcast.

The check address block 310 checks to determine if the address input 98 is receiving a signal from first display unit 227 and determines if the second display unit 228 has a current address. If the conditions are correct, check address block 310 signals accept block 312 to receive the broadcast address. Acknowledge block 314 sends an address response from microprocessor 62 at signal generator 70 along communication conductor 198 to computer 230. Address assignment block 306 in computer 230, repeats for adjacent display units 12 until computer 230 does not receive an address acknowledgement.

After addressing each display unit 12, sign controller 18 prepares to display information. Map block 320 creates a map of the addresses, in each display unit 12 in sign 10, in the memory 232 of computer 230. Map bit block 322 manipulates the information to be displayed to create a display bit map for each addressed display unit 12. Map bit block 322 attaches the address of each display unit 12 to its corresponding bit map. Broadcast bit assignment block 324 broadcasts a control signal having a packet of information containing the address and the appropriate display information for each display unit 12, this control signal is transmitted from information output 236 along communication conductor 198. Receive bit map block 326, in each display unit 12, receives the bit map corresponding to the address of the particular display unit 12. This bit map information is stored in the memory 64 of the display unit 12.

As described in FIG. 14, the microprocessor 62 in the display unit 12 performs a sequence of operations to display the information sent from signal controller 18. The acknowledge block 327, in the display unit 12, acknowledges the receipt of the bit mat by the display unit 12. The assign bits block 328 engages the microprocessor 62 to examine the bit map contained in memory 64 in the display unit 12. Each bit in the bit map is assigned to a corresponding display element 96 on the display unit 12. Transfer bits block 330 transfers the bit map information from memory 64 to message output portion 72 and to message input 88 of light driver 87. The store block 332 in light driver 87 stores bit map information in memory 90 of light driver 87. Broadcast energize block 334 in signal controller 18, commands an energize command on communication conductor 198 to affect the control of drive transistors 92. As should be understood, the sending of information from signal controller 18 through microprocessor 62 in display unit 12 to light drivers 87 may require a period of one to ten seconds.

As should be understood, the information on the sign 10, should not be changing as information is received by each individual display unit 12. To overcome this, the signal controller 18 transfers information to each display unit 12 until all the display information is available in the memory 90 of the light drivers 87 in each display unit 12 in sign 10. When the information is to be displayed, energize block 334, in signal controller 18, broadcasts an energize signal simultaneously on all information outputs 236 to all display units 12 in sign 10. The receive energize block 336 in the circuitry in each display unit 12 receives the energize signal and strobe portion 71 generates a command to strobe input 89 of the light driver 87. The energize command on strobe input 89 of light driver 87 causes flip-flop block 338 in light driver 87 to transfer the bit map information from the memory 90 to the drive transistors 92. It should be understood, the microprocessor 62 may also use the output enabler portion 73 connected to power input 93 on light driver 87 to energize all drive transistors 92 simultaneously or to brightness of the display elements 96 by pulse width modulation of power supplied to the light driver 87.

The bit map contains a bit as a 1 or 0 corresponding to each display element 96. If the bit is 1, the display element 96 may be illuminated. Upon being energized, each display element 96 attached to a drive transistor 92 is illuminated if the appropriate bit map information sent from signal controller 18 corresponds to that particular display element 96. The bit map causes the drive transistor 92 to supply power to light emitting diode 74 to illuminate the display element 96.

In the event a display unit 12 should fail, the signal controller 18 will detect the failure by the display unit 12 because the failed display unit 12 will not acknowledge the next bit map from broadcast bit assignment block 324. The signal controller 18 may automatically request maintenance by signalling an operator with a information output. The circuitry 61 in each display unit is also comprises a diagnostic portion 241 shown in FIG. 6. This diagnostic portion 241 allows the circuitry 61 to cycle each display element on and off to diagnose the operability of each light emitting diode 74 in the circuitry 61.

To remove a display unit 12, the power supply 244 is disconnected to remove power from the sign 10. The failed display unit 12 is removed from the mounting track 14 by disengaging all mounting screws 160 from the mounting track 14 and replaced with a new interchangeable display unit 12. Upon energizing power supply 244, computer 230 will automatically readdress each display unit 12 in sign 10 as described above.

The display units 12 may also be disassembled from sign 10 and reassembled onto a new mounting structure 16 in a new configuration. Computer 230 will readdress the new sign 10 and display information.

The present invention may be embodied in other specific forms without departing from the spirit of essential attributes thereof; therefore, the illustrated embodiment should be considered in all respects as illustrative and not restrictive, reference being made to the appended claims rather than to the foregoing description to indicate the scope of the invention.

What is claimed:

1. A reconfigurable modular sign system for placement and viewing along roadways and for displaying electronically changeable message information comprising:

a) a mounting structure placeable on a roadway or the ground;

b) at least one mounting track affixed to said mounting structure, a plurality of conductors extending down said mounting track including a communications conductor, said mounting track providing for attachment of a variable number of display units for reconfiguring the sign;

c) a plurality of enclosed interchangeable display units, each having a front side, each display unit connectable to and disconnectable from the mounting track from the front side facilitating reconfiguring the sign, the display units positionable adjacent one another to create the sign, the sign reconfigurable by adding or removing display units of said sign, the display units, when placed on said mounting track, extending outwardly from the mounting track with and the front side of each of the sign units outwardly exposed whereby each display unit is accessed for reconfiguring the sign without opening a sign enclosure, each display unit further comprising and containing a plurality of light sources arranged in a pattern and electrical circuitry electrically connected to the plurality of conductors, the electrical circuitry including a microprocessor, the microprocessor controlling each light source in said plurality of light sources, the circuitry in each of said plurality of display units further comprises a memory for receiving and retaining a display unit address, whereby each of said display units are individually addressable and automatically addressable as the sign is reconfigured; and d) a sign controller in communication with each of the display units through the communication conductor when the display units are connected to the mounting track, said sign controller configured for sending specific control signals addressed to each said display unit for controlling the selection of light sources in each of said display units for creating a message on the sign.

2. The modular sign assembly of claim 1 wherein the sign controller is configured for initiating the readdressing of the display units upon reconfiguring the sign.

3. A modular sign in combination with a mounting structure, the modular sign comprising:

a) a mounting track connected to the mounting structure;

b) a plurality of conductors extending along said mounting track;

c) a plurality of display units mounted on said mounting track adjacent to one another, each display unit comprising circuitry with a microprocessor and a plurality of light emitting diodes arranged in a pattern, the plurality of conductors on the mounting track connected to the circuitry of each display unit; and wherein the display units are further electrically connected in series by way of one jumper extending between each pair of adjacent display units, and wherein the circuitry of each display unit is configured such that a display unit may be assigned an address by way of said jumpers.

4. A modular sign in combination with a mounting structure, the modular sign comprising:

a) a mounting track connected to the mounting structure;

b) a plurality of conductors extending down said mounting track;

c) a plurality of display units mounted on said mounting track, each display unit comprising circuitry with a microprocessor and a plurality of light emitting diodes arranged in a pattern, the plurality of conductors on the mounting track connected to the circuitry of each display unit, comprising a first display unit on the mounting track and a second display unit on the mounting track adjacent the first display unit;

d) a plurality of jumpers along the mounting track;

e) a first communications connector, a second communications connector and a third communication connector in each display unit, the first, second and third communication connectors connected to the circuitry in the display unit;

f) one of the plurality of jumpers electrically connected to the third communication connector of the first display unit and to the second communication connector of the second display unit; and g) the circuitry in each display unit configured to accept an address for the display unit.

5. A modular sign in combination with a mounting structure, the modular sign comprising:

a) a mounting track connected to the mounting structure;

b) a plurality of conductors extending down said mounting track;

c) a plurality of display units mounted on said mounting track, each display unit comprising circuitry with a microprocessor and a plurality of light emitting diodes arranged in a pattern, the plurality of conductors on the mounting track connected to the circuitry of each display unit, comprising a first display unit on the mounting track and a second display unit on the mounting track adjacent the first display unit; the mounting track having a front side and a backside, the mounting track mounted on both the front side and the back side of the mounting structure, the display units mounted on said mounting track on both the front side and the back side whereby the modular sign is a two sided back to back sign.

6. The invention of claim 5 further comprising a sign controller for individually addressing each display unit and controlling the illumination of each light emitting diode.

7. A modular sign in combination with a mounting structure, the modular sign comprising:

a) a sign controller;

b) a plurality of electrically interchangeable individually addressable display units on the mounting structure, each display unit comprising a plurality of light sources arranged in a pattern, a first communication connector in the display unit circuitry, a microprocessor in the display unit circuitry and connected to the first communication connector, the sign controller connected to the first communication connector in the circuitry in each display unit, a second and a third communication connector connected to the circuitry in each of the display units, the third communication connector in one display unit connected to the second communication connector in an adjacent display unit to positionally identify the display units, each display unit removable from said sign, the sign controllers in communication for con each display unit for controlling all said display units.

8. A modular sign in combination with a mounting structure, the modular sign comprising:

a) a sign controller;

b) a plurality of electrically interchangeable display units on the mounting structure, each display unit comprising a plurality of light sources arranged in a pattern, each display unit removable from said sign, the sign controllers in communication with each display unit for controlling all said display units wherein a circuit board is in each display unit, each light source comprises a light emitting diode having a body and a first and second flexible electrical connection, the first and second flexible electrical connection attached to the circuit board, the body spaced from the circuit board, whereby the body is movable with respect to the circuit board to adjust the direction of light coming from the light emitting diode.

9. A modular sign in combination with a mounting structure, the modular sign comprising:

a) a sign controller;

b) a plurality of electrically interchangeable individually addressable display units on the mounting structure, each display unit comprising a plurality of light sources arranged in a pattern, each display unit removable from said sign, the sign controllers in communication with each display unit for controlling all said display units;

c) a mounting track intermediate to the mounting structure and the first and second display units, a plurality of mounting holes in the mounting track for aligning each display unit on the mounting track.

* * * * *

UNITED STATES PATENT AND TRADEMARK OFFICE
CERTIFICATE OF CORRECTION

PATENT NO.   : 5,914,698
DATED        : June 22, 1999
INVENTOR(S)  : Timothy Nicholson, et al.

It is certified that error appears in the above-identified patent and that said Letters Patent is hereby corrected as shown below:

On the title page:

References Cited:   please delete "4,050, 834" and insert in its place
                    --4,050,823--

References Cited:   please delete "9/1977" and insert in its place --8/1977--

Col. 5, line 9:   please delete "promimate" and insert in its place
                  --proximate--
Col. 5, line 10:  please delete "promimate" and in its place insert
                  --proximate--
Col. 6, line 1:   please delete the word "first" and insert in its place
                  --third--
Col. 6, line 3:   Delete the word "First" and insert in its place --Third--
Col. 6, line 5:   Delete the word "First" and insert in its place --Third--
Col. 14, line 33: Delete the words "with and" and in its place
                  insert --and with--
Col. 16, line 21: Please delete the words "for con" and in its place
                  insert --with--

Signed and Sealed this

Twenty-sixth Day of December, 2000

Attest:

Q. TODD DICKINSON

Attesting Officer

Director of Patents and Trademarks